US010051209B2

(12) United States Patent
Benmokhtar Benabdellah et al.

(10) Patent No.: US 10,051,209 B2
(45) Date of Patent: Aug. 14, 2018

(54) COMBINED VISIBLE AND NON-VISIBLE PROJECTION SYSTEM (71) Applicant: OMNIVISION TECHNOLOGIES, INC., Santa Clara, CA (US)

(72) Inventors: Youssef Benmokhtar Benabdellah, San Francisco, CA (US); Ruipeng Sun, Pleasanton, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 152 days.

(21) Appl. No.: 14/249,212

(22) Filed: Apr. 9, 2014

(65) Prior Publication Data

US 2015/0296150 A1 Oct. 15, 2015

(51) Int. Cl.
| | |
|---|---|
| *G02B 26/08* | (2006.01) |
| *G06F 3/01* | (2006.01) |
| *H04N 5/33* | (2006.01) |
| *H04N 9/31* | (2006.01) |
| *G02B 27/10* | (2006.01) |
| *H04N 13/02* | (2006.01) |
| *G06F 3/042* | (2006.01) |
| *G02B 5/20* | (2006.01) |

(52) U.S. Cl.
CPC .............. *H04N 5/33* (2013.01); *G02B 27/104* (2013.01); *G02B 27/1026* (2013.01); *G02B 27/1033* (2013.01); *G06F 3/017* (2013.01); *G06F 3/0425* (2013.01); *H04N 5/332* (2013.01); *H04N 9/3129* (2013.01); *H04N 9/3164* (2013.01); *H04N 9/3194* (2013.01); *H04N 13/0207* (2013.01); *H04N 13/0253* (2013.01); *G02B 5/201* (2013.01)

(58) Field of Classification Search
CPC ............ G02B 27/1026; G02B 27/1033; G02B 27/104; G02B 5/201; G06F 3/017; H04N 5/33; H04N 9/3129; H04N 9/3164
USPC ........................................................ 348/164
See application file for complete search history.

(56) References Cited

U.S. PATENT DOCUMENTS 7,532,181 B2 * 5/2009 Tang ................... G09G 3/3225
345/690
7,703,926 B2 4/2010 Hong et al.
(Continued)

FOREIGN PATENT DOCUMENTS

TW    M300825 U    11/2006
TW    201201077 A   1/2012
(Continued)

OTHER PUBLICATIONS

Lee,Jin-Ho et al., "Laser TV for Home Theater," Proceedings of SPIE, vol. 4657, Projection Displays VIII (Apr. 30, 2002), pp. 138-145.

(Continued)

*Primary Examiner* — Deirdre Beasley
(74) *Attorney, Agent, or Firm* — Christensen O'Connor Johnson Kindness PLLC (57) ABSTRACT

A projection display system includes a visible light source coupled to project a visible image onto a screen. An infrared (IR) light source is coupled to project a non-visible IR image onto the screen. The non-visible IR image on the screen is independent of the visible image on the screen. The visible image and the non-visible IR image are overlapped and are displayed simultaneously on the screen.

15 Claims, 8 Drawing Sheets

(56) References Cited

U.S. PATENT DOCUMENTS

| | | | |
|---|---|---|---|
| 8,120,239 B2 | 2/2012 | Cheon et al. | |
| 9,052,579 B1* | 6/2015 | Poulad | G03B 21/145 |
| 9,204,121 B1* | 12/2015 | Marason | H04N 13/0007 |
| 2003/0103171 A1* | 6/2003 | Hall, Jr. | H04N 9/3105 |
| | | | 349/5 |
| 2006/0285079 A1* | 12/2006 | Wada | G02B 13/04 |
| | | | 353/46 |
| 2006/0291014 A1* | 12/2006 | Hirata | G03B 21/14 |
| | | | 358/504 |
| 2008/0174742 A1* | 7/2008 | Ito | G03B 21/006 |
| | | | 353/31 |
| 2009/0128451 A1* | 5/2009 | Tokui | G03B 33/08 |
| | | | 345/55 |
| 2009/0180079 A1* | 7/2009 | Oakley | G03B 21/26 |
| | | | 353/31 |
| 2010/0165470 A1* | 7/2010 | Davis | G02B 26/0833 |
| | | | 359/626 |
| 2010/0309439 A1* | 12/2010 | Bi | G03B 21/2033 |
| | | | 353/33 |
| 2010/0328433 A1* | 12/2010 | Li | G02B 27/26 |
| | | | 348/46 |
| 2011/0063574 A1* | 3/2011 | Freeman | G02B 27/2207 |
| | | | 353/7 |
| 2011/0228232 A1 | 9/2011 | Sakata et al. | |
| 2011/0249014 A1* | 10/2011 | Kolstad | H04N 5/33 |
| | | | 345/589 |
| 2011/0249197 A1* | 10/2011 | Sprowl | G02B 27/0905 |
| | | | 348/744 |
| 2011/0310060 A1* | 12/2011 | Li | G06F 3/042 |
| | | | 345/175 |
| 2011/0312116 A1 | 12/2011 | Weiss et al. | |
| 2012/0044585 A1* | 2/2012 | Yamamoto | G02B 13/16 |
| | | | 359/717 |
| 2012/0162608 A1 | 6/2012 | Eguchi | |
| 2012/0268371 A1* | 10/2012 | Takahashi | G06F 3/0304 |
| | | | 345/157 |
| 2012/0280941 A1* | 11/2012 | Hu | G03B 33/12 |
| | | | 345/175 |
| 2013/0215235 A1* | 8/2013 | Russell | H04N 13/0203 |
| | | | 348/47 |
| 2013/0222237 A1 | 8/2013 | Jesme et al. | |
| 2013/0222892 A1 | 8/2013 | Jesme et al. | |
| 2013/0241822 A1* | 9/2013 | Sharma | G06F 3/02 |
| | | | 345/156 |
| 2013/0241890 A1* | 9/2013 | Sharma | G06F 3/0426 |
| | | | 345/175 |
| 2013/0241907 A1* | 9/2013 | Amirparviz | G02B 27/0093 |
| | | | 345/207 |
| 2014/0055755 A1* | 2/2014 | Fan | G02B 27/1033 |
| | | | 353/31 |
| 2014/0071404 A1 | 3/2014 | Davidson | |
| 2014/0293231 A1* | 10/2014 | Yoon | G03B 21/142 |
| | | | 353/20 |
| 2014/0362052 A1* | 12/2014 | McCaughan | G06F 3/0418 |
| | | | 345/175 |

FOREIGN PATENT DOCUMENTS

| | | |
|---|---|---|
| TW | 201234236 A | 8/2012 |
| TW | 201237715 A | 9/2012 |

OTHER PUBLICATIONS

Hornbeck, L.J., "Current status of the digital micromirror device (DMD) for projection television applications," Electron Devices Meeting, 1993. IEDM '93. Technical Digest., International, pp. 381-384, Dec. 5-8, 1993.

Jutamulia, S. et al., "Infrared signal processing using a liquid crystal television," Optical Engineering vol. 30, No. 2:178-182 (Feb. 1991).

TW Application No. 103135255—Taiwanese Office Action and Search Report, with English Translation, dated Jan. 7, 2016 (12 pages).

CN Patent Application No. 201410788533.0—Chinese Office Action and Search Report, dated Jul. 4, 2016, with English Translation, 12 pages.

CN Patent Application No. 201410788533.0—Chinese Office Action and Search Report, dated Apr. 24, 2017, with English Translation, 22 pages.

Third Chinese Office Action dated Nov. 16, 2017, for Chinese Application No. 201410788533.0, filed Dec. 17, 2014, 26 pages.

Fourth Chinese Office Action and Translation dated May 2, 2018, for Chinese Application No. 201410788533.0, filed Dec. 17, 2014, 5 pages.

* cited by examiner

COMBINED VISIBLE AND NON-VISIBLE PROJECTION SYSTEM

BACKGROUND INFORMATION

Field of the Disclosure

The present invention relates generally to projectors. More specifically, examples of the present invention are related to a projection system that projects visible and non-visible images.

Background

Interest in three dimensional (3D) cameras is increasing as the popularity 3D applications continues to grow in applications such as imaging, movies, games, computers, user interfaces, and the like. A typical passive way to create 3D images is to use multiple cameras to capture stereo or multiple images. Using the stereo images, objects in the images can be triangulated to create the 3D image. Another way to create 3D images is to use a time-of-flight camera. By measuring the time of flight of every point of an object in the image, a 3D image of the object in the image can be created.

Currently, for gesture recognition utilized in for example gaming and user interfaces, infrared (IR) light pattern is typically projected onto an object. An IR camera detects the IR light pattern that is projected onto the object, and then a computer is used to analyze the detected IR light pattern on the object to determine the 3D position of the object. Typically, the structured light that is projected in 3D imaging applications includes a grating pattern. The grating pattern is projected onto a surface of the object. A profile of the surface at a position, e.g., a protrusion or a recess relative to a flat surface, can be calculated from the deformation of the projected grating at that position. The deformation typically relates to the shift or offset of the projected grating from its image if the surface is flat without a profile. Currently, gesture recognition systems may be utilized for a variety of applications such as for controlling a computer, gaming system, as well as many other uses. Typically, a light source for gesture recognition is mounted on or near a display, such as for example on a television or a computer screen, to project the structured light at a user that is interacting with the television or computer screen.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Examples in accordance with the teaching of the present invention describe a combined visible and non-visible projection system, which in one example combines an RGB visual projection and IR illumination system into a single projection system. Instead of using a separate RGB projection display with a separate IR pattern generator, examples in accordance with the teachings of the present invention combine an RGB projection display and an IR projection display, which can display on the same screen a still or video RGB image and an IR pattern that is independent of the RGB image. The RGB image is visible to a human, but the IR image is non-visible to human, and can be used for gesture recognition that will be detected by an IR camera and analyzed by a computer. The combined visible and non-visible projection system enables both visual RGB color projection displays and IR based applications, such as for example gesture recognition and 3D mapping or printing in accordance with the teachings of the present invention.

Accordingly, an example combined visible and non-visible projection system in accordance with the teachings of the present invention allows for the possibility to project on the same screen a visible image as well as dynamically changing distinct IR patterns at different times based on conditions rather than being limited to a projection of a static or fixed single IR pattern. Thus, an example combined visible and non-visible projection system in accordance with the teachings of the present invention features the advantage of having the ability to adjust the projected IR pattern dynamically to account for wavelength shifts, leading to better resolution, better accuracy, and simpler depth computations in accordance with the teachings of the present invention.

Figure 1:
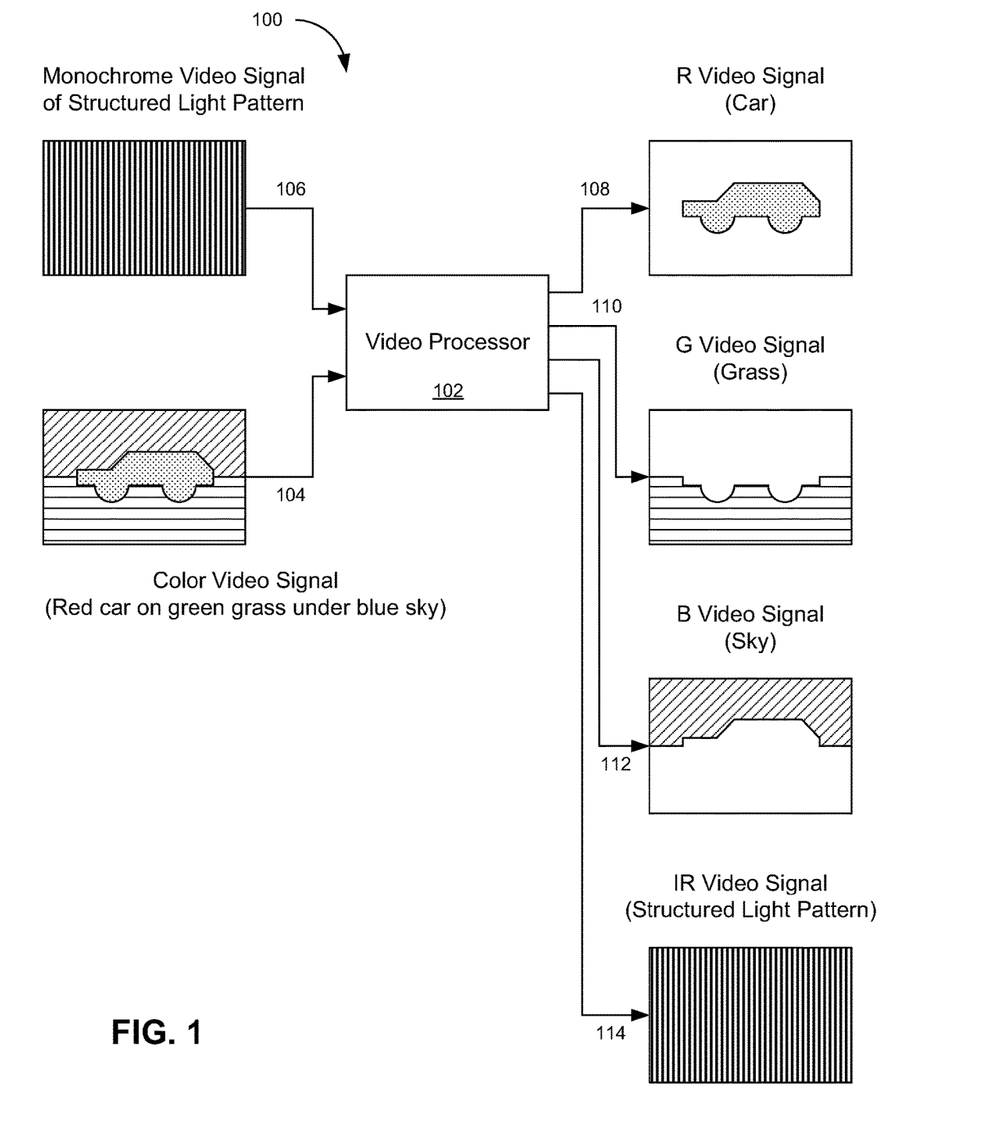
FIG. 1 shows one example of a portion of a projection display system including a video processor for a projection display in accordance with the teachings of the present invention.

To illustrate, FIG. 1 shows one example of a portion of a projection display system 100 including a video processor 102 for a projection display in accordance with the teachings of the present invention. As illustrated in the depicted example, video processor 102 is coupled to receive a color video signal 104, which may be from a color video camera, a set top box, an optical disc player, a computer, or any suitable video source. In the illustrated example, the color video signal 104 represents a color image of a red car on green grass under a blue sky. In contrast to conventional projection displays, video processor 102 also receives a monochrome video signal 106 of a structured light pattern, which may for example be received from a computer.

As shown in the example depicted in FIG. 1, video processor 102 generates: a red (R) video signal 108, for example to display the red car; a green (G) video signal 110, for example to display green grass; a blue (B) video signal 112, for example to display a blue sky; and an IR video signal 114 to display a structured light pattern. Note that R video signal 108, G video signal 110, and B video signal 112 are all component colors of a single color video image visible to a human. Accordingly, each color R, G, or B video signal cannot be changed relative to the other two color video signals since all three of the R, G, and B video signals together form a single color video image that is visible to the human. However, IR video signal 114 may be independent of R video signal 108, G video signal 110, and B video signal 112 in accordance with the teachings of the present invention.

Figure 2:
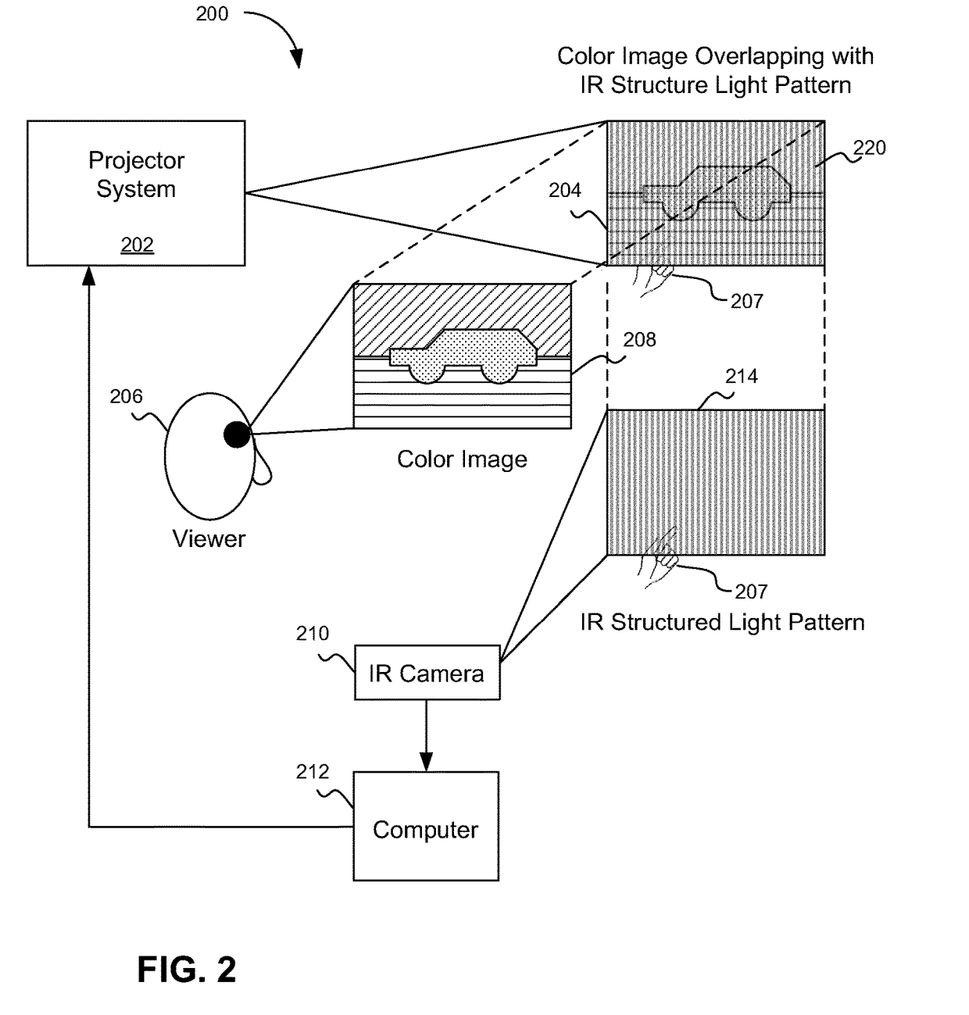
FIG. 2 shows one example of a portion of a projection display system including an example combined visible and non-visible projection display system that projects an RGB video, and an IR video onto a screen in accordance with the teachings of the present invention.

FIG. 2 shows one example of a portion of a projection display system 200 including an example combined visible and non-visible projector system 202 that projects a video image driven by R video signal 108, G video signal 110, B video signal 112, and IR video signal 114 onto a screen in accordance with the teachings of the present invention. As shown in the depicted example, projector system 202 projects a projected image 204 on a screen 220 of a visible color image 208, including for example the red car on the green grass under the blue sky, overlapping and simultaneously displayed with a non-visible IR structured light pattern 214 on the screen 220 in accordance with the teachings of the present invention. As shown in FIG. 2, a human viewer 206 can see the visible color image 208 of the example a red car on the green grass under the blue sky, but the human viewer 206 is unable to see the invisible IR structured light pattern 214.

In the illustrated example, projection display system 200 also includes an IR camera 210 that can sense and detect the IR structured light pattern 214, which is not visible to human viewer 206. In one example, the detected IR structured light pattern 214 is provided to a computer 212 for processing and analysis. Since the IR structured light pattern 214 is invisible to the human viewer 206, the IR structured light pattern 214 may be independent of the visible color image 208 and can therefore be dynamically updated as needed in accordance with the teachings of the present invention. If the structured light pattern 214 is projected onto an object in front of the screen 220, such as for example a human hand 207, computer 212 can analyze the detected structured light pattern 214 distorted by hand 207 as detected by IR camera 210, and then compute a 3D image of the object based on the distortions of the structured light pattern 214 caused by human hand 207, which can be used for gesture recognition or other purposes in accordance with the teachings of the present invention.

In one example, IR structured light pattern 214 can also be changed dynamically independent of the visible color image 208. For instance, in one example, the computer 212 can change the pitch and/or the orientation of the grating of structured light pattern 214 in response to a variety of conditions, such as the detected IR structured light pattern 214 as distorted for example by human hand 207, or in response to a particular scene of the color image 208, or any other condition, while the same projection of color image 208 is used. In another example, IR structured light pattern 214 may contain a non-uniform grating for structured light pattern 214 or any specific pattern generated by a computer 212 in accordance with the teachings of the present invention.

Figure 3:
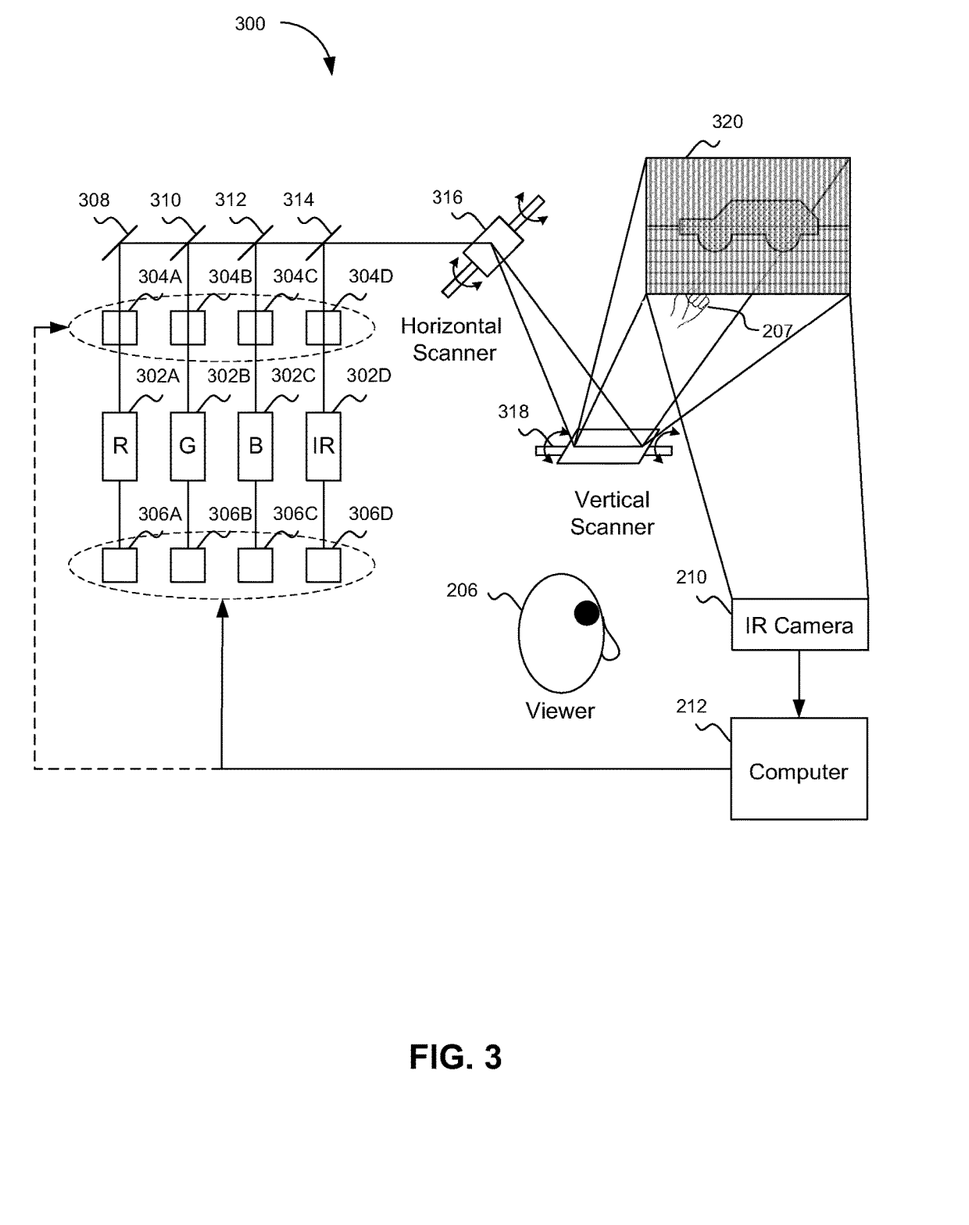
FIG. 3 shows an example laser scanning projection display system in accordance with the teachings of the present invention.

FIG. 3 shows an example laser scanning projection display system 300 in accordance with the teachings of the present invention. In one example, laser scanning projection display system 300 includes a visible red (R) laser 302A, a visible green (G) laser 302B, a visible blue (B) laser 302C, and an non-visible IR laser 302D. In another example, it is appreciated that any one or more of the R laser 302A, the G laser 302B, the B laser 302C, and/or the IR laser 302D may be replaced with R, G, B, and/or IR LEDs, respectively, in accordance with the teachings of the present invention. Continuing with the example depicted in FIG. 3, the intensity of R laser 302A may be controlled using an optical modulator 304A or may be controlled by an electrical driver 306A, under the control of for example a computer 212. Similarly, optical modulators 304B, 304C, and 304D or electric drivers 306B, 306C, and 306D control the intensities of the G, B, and IR lasers 302B, 302C, and 302D, respectively, under the control of a computer 212.

As shown in the depicted example, the R laser beam from R laser 302A is reflected by a mirror 308, and combined with the G laser beam from G laser 302B by a dichroic mirror 310. The combined R and G laser beams are further combined with the B laser beam from B laser 302C by a dichroic mirror 312. In the example, the combined R, G, and B laser beams are combined with the IR laser beam from IR laser 302D by a dichroic mirror 314.

As shown in the example depicted in FIG. 3, the combined R, G, B, and IR laser beams are all reflected by the same horizontal scanner 316 toward the same vertical scanner 318 forming a projection image on a screen 320. In this manner, a visible color image is generated on screen 320 overlapping with an invisible IR structured light pattern. A human viewer 206 will see the visible color image, and an IR camera 210 will detect the invisible IR structured light pattern, and therefore detect hand 207 in front of screen 320 in accordance with the teachings of the present invention.

Figure 4:
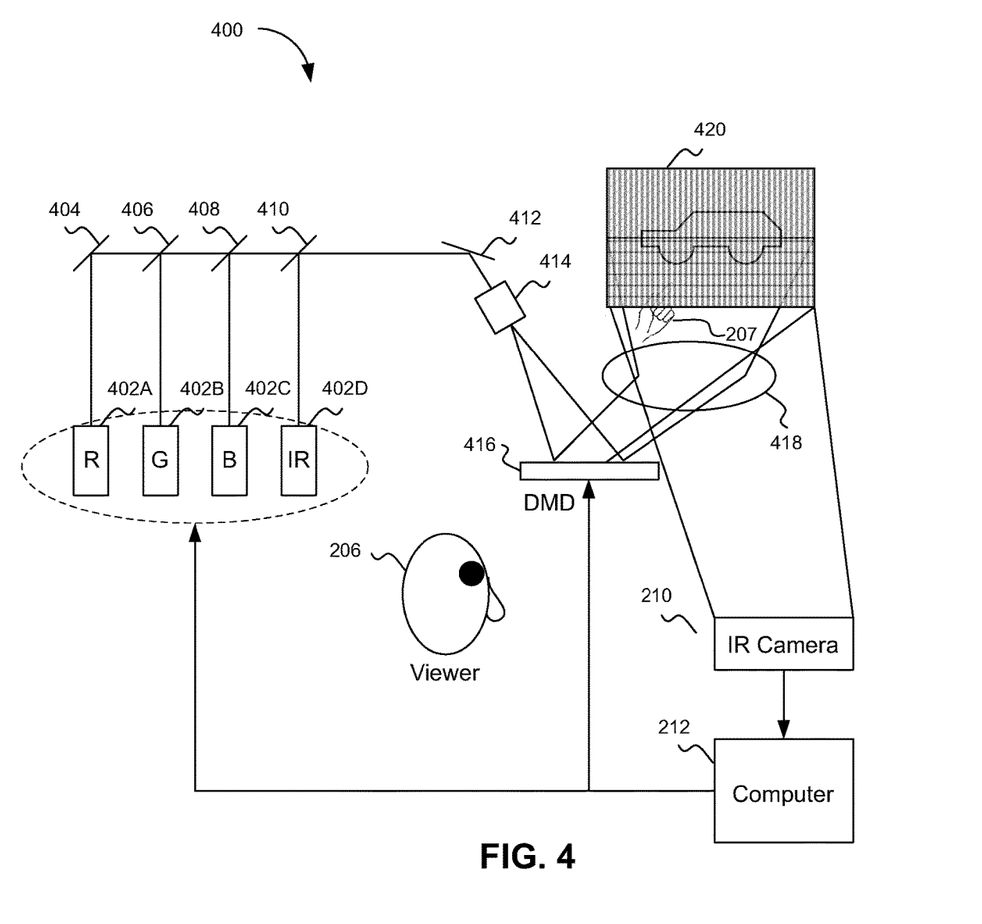
FIG. 4 shows an example digital micro-mirror projection display system in accordance with the teachings of the present invention.

FIG. 4 shows an example of a projection display system 400 that includes a digital micro-mirror device (DMD) in accordance with the teachings of the present invention. In one example, the DMD projection display system 400 includes a red (R) light source 402A, a green (G) light source 402B, a blue (B) light source 402C, and an IR laser 402D. In the example depicted in FIG. 4, the R, G, B, and IR light sources may be lasers, LEDs, or other light sources. The light beam from R light source 402A may be switched on and off electrically under the control of for example a computer 212. Similarly, the light beams from G light source 402B, B light source 402C, and IR laser 402D may be switched on and off electrically under the control of for example computer 212.

As shown in the depicted example, the R light beam is reflected by a mirror 404, and combined with the G light beam by a dichroic mirror 406. The combined R and G light beams are further combined with the B light beam by a dichroic mirror 408. The combined R, G, and B light beams are combined with the IR light beam by a dichroic mirror 410.

As shown in the example depicted in FIG. 4, the combined R, G, B, and IR light beams are reflected by an optional mirror 412. In one example, the combined beams are all expanded by an expanding lens 414. In the illustrated example, the expanded beams illuminate a DMD 416. In one example, the DMD 416 includes an array of micro-mirrors. In one example, each micro-mirror included in DMD 416 corresponds to a pixel on the display. In one example, each micro-mirror included in DMD 416 can be controlled individually by a computer 212 such that an image can be formed and displayed. As shown in the depicted example, the expanded beams that illuminate DMD 416 are modulated and reflected by DMD 416. The reflected light from DMD 416 passes through a projection lens 418 and arrives at a screen 420. The image formed by DMD 416 is projected onto screen 420.

In one example, DMD 416 forms R, G, B, and IR images sequentially, which are synchronized with computer 212 switching the R, G, B, and IR beams. In this manner, a color image is generated on screen 420 overlapping with an invisible IR structured light pattern. A human viewer 206 will see the visible color image, and an IR camera 210 will detect the invisible IR structured light pattern, and therefore detect hand 207 in front of screen 420 in accordance with the teachings of the present invention.

In another example, it is appreciated that four separate DMDs 416 may be used, in which each respective DMD used for generating an image of different wavelength. In the example, each DMD is illuminated with an expanded beam and four images generated by four DMDs are combined using dichroic mirrors similar to the example discussed above in accordance with the teachings of the present invention.

Figure 5A:
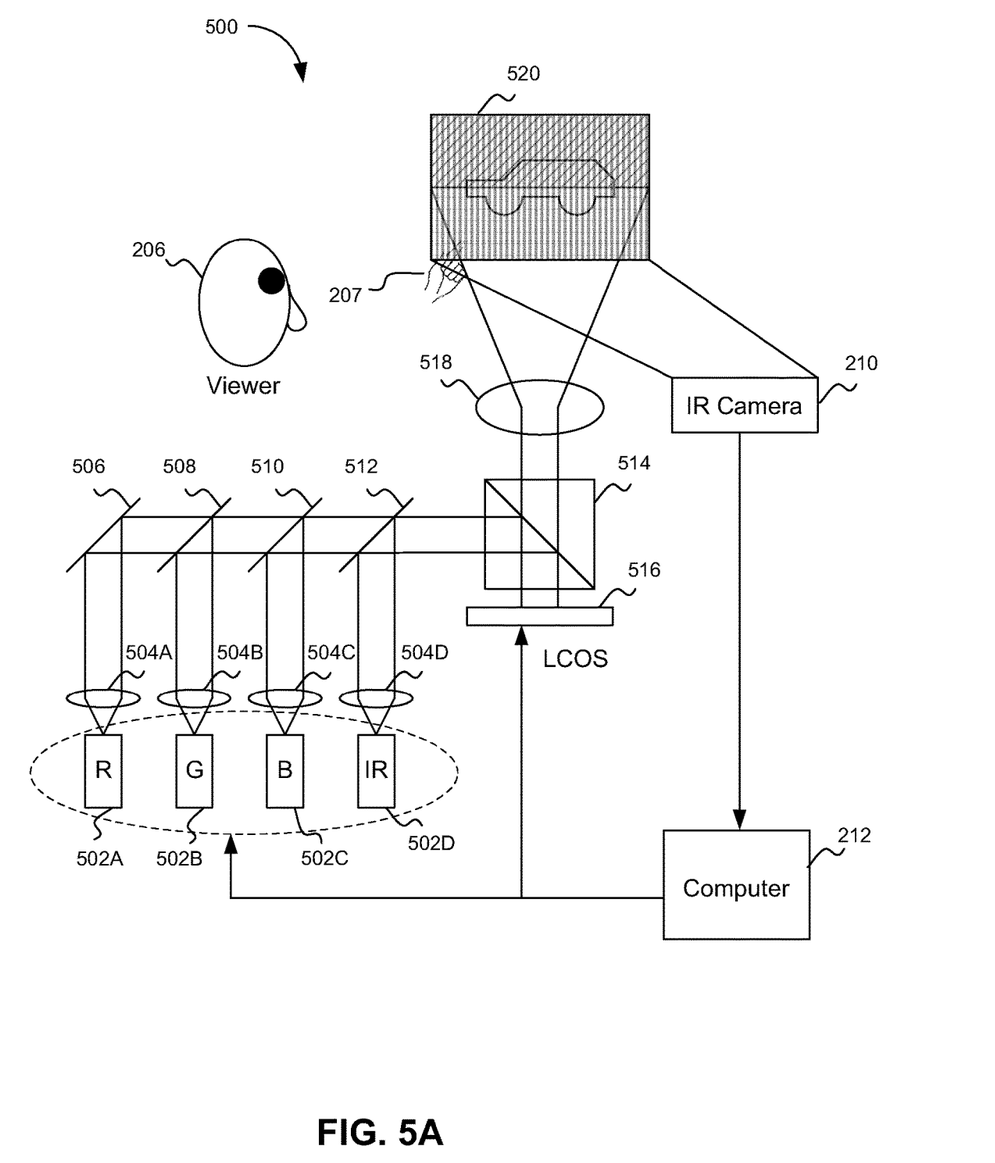
FIG. 5A shows an example of a liquid crystal on silicon (LCOS) projection display system in accordance with the teachings of the present invention.

FIG. 5A shows an example of a liquid crystal on silicon (LCOS) projection display system 500 in accordance with the teachings of the present invention. As shown in the depicted example, LCOS projection display system 500 includes a red (R) light source 502A, a green (G) light source 502B, a blue (B) light source 502C, and an IR laser 502D. R, G, B, and IR light sources may be lasers, LEDs, or other light sources. In one example, the light beams from R light source 502A, G light source 502B, B light sources 502C, and IR laser 502D may be switched on and off electrically under the control of for example a computer 212.

In one example, the light beams from R light source 502A, G light source 502B, B light sources 502C, and IR laser 502D are collimated by lenses 504A, 504B, 504C, and 504D, respectively. The collimated R light beam is reflected by a mirror 506, and combined with the collimated G light beam by a dichroic mirror 508. The combined R and G light beams are further combined with the collimated B light beam by a dichroic mirror 510. The combined R, G, and B light beams are one more time combined with the collimated IR laser beam by a dichroic mirror 512.

As shown in the example depicted in FIG. 5A, the combined R, G, B, and IR beams are reflected by a polarizing beam splitter (PBS) 514 toward an LCOS display panel 516. Note that a PBS also functions as a polarizer for unpolarized light. In one example, the polarization of each beam is modulated by LCOS display panel 516 under the control of for example a computer 212. The beams are reflected by LCOS display panel 516 back to PBS 514. The polarization modulation becomes intensity variation forming an image after the beam passes through PBS 514. The image is projected by a projection lens 518 onto a screen 520.

In one example, LCOS display panel 516 forms the R, G, B, and IR image sequentially, which is synchronized with computer 212 switching the R, G, B, and IR beams. In this manner, a visible color image is generated on screen 520 overlapping with an invisible IR structured light pattern. A human viewer 206 will see the visible color image, and an IR camera 210 will detect the invisible IR structured light pattern, and therefore detect hand 207 in front of screen 520 in accordance with the teachings of the present invention.

Figure 5B:
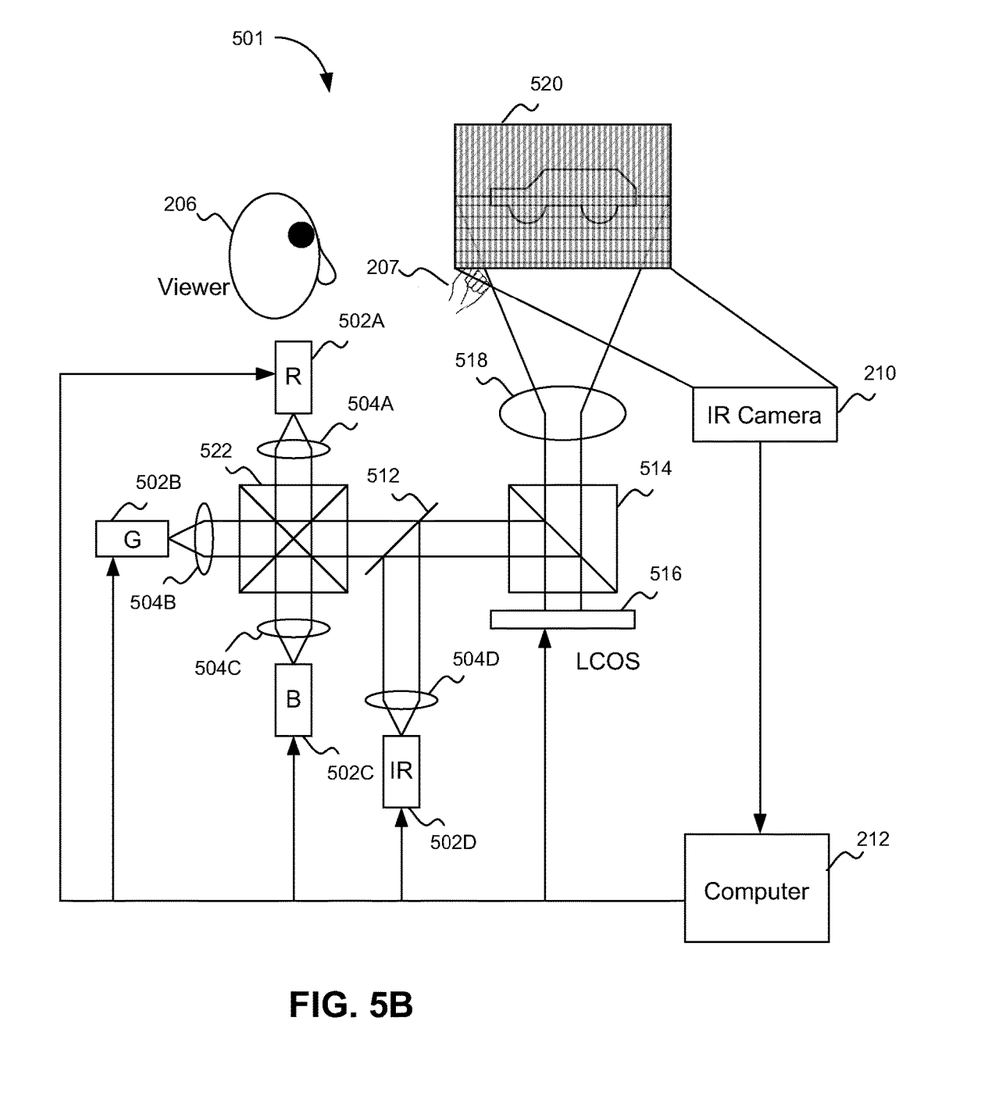
FIG. 5B shows another example of a LCOS projection display system in accordance with the teachings of the present invention.

FIG. 5B shows another example of an LCOS projection display system 501 in accordance with the teachings of the present invention. As will be appreciated, LCOS projection display system 501 shares many similarities with LCOS projection display system 500 of FIG. 5A. However, in the alternative example illustrated in FIG. 5B, the collimated beams from R light source 502A, G light source 502B, B light sources 502C are combined using a dichroic combiner cube (X-cube) 522 before they are combined with the collimated beam from IR laser 502D using dichroic mirror 512 as shown.

Continuing with the example depicted in FIG. 5B, the combined R, G, B, and IR beams are reflected by a polarizing beam splitter (PBS) 514 toward an LCOS display panel 516. In one example, the polarization of each beam is modulated by LCOS display panel 516 under the control of for example a computer 212. The beams are reflected by LCOS display panel 516 back to PBS 514. The polarization modulation becomes intensity variation forming an image after the beam passes through PBS 514. In the example, the image is projected by a projection lens 518 onto screen 520.

In one example, LCOS display panel 516 forms the R, G, B, and IR image sequentially, which is synchronized with computer 212 switching the R, G, B, and IR beams. In this manner, a visible color image is generated on screen 520 overlapping with an invisible IR structured light pattern. A human viewer 206 will see the visible color image, and an IR camera 210 will detect the invisible IR structured light pattern, and therefore detect hand 207 in front of screen 520 in accordance with the teachings of the present invention.

Figure 6:
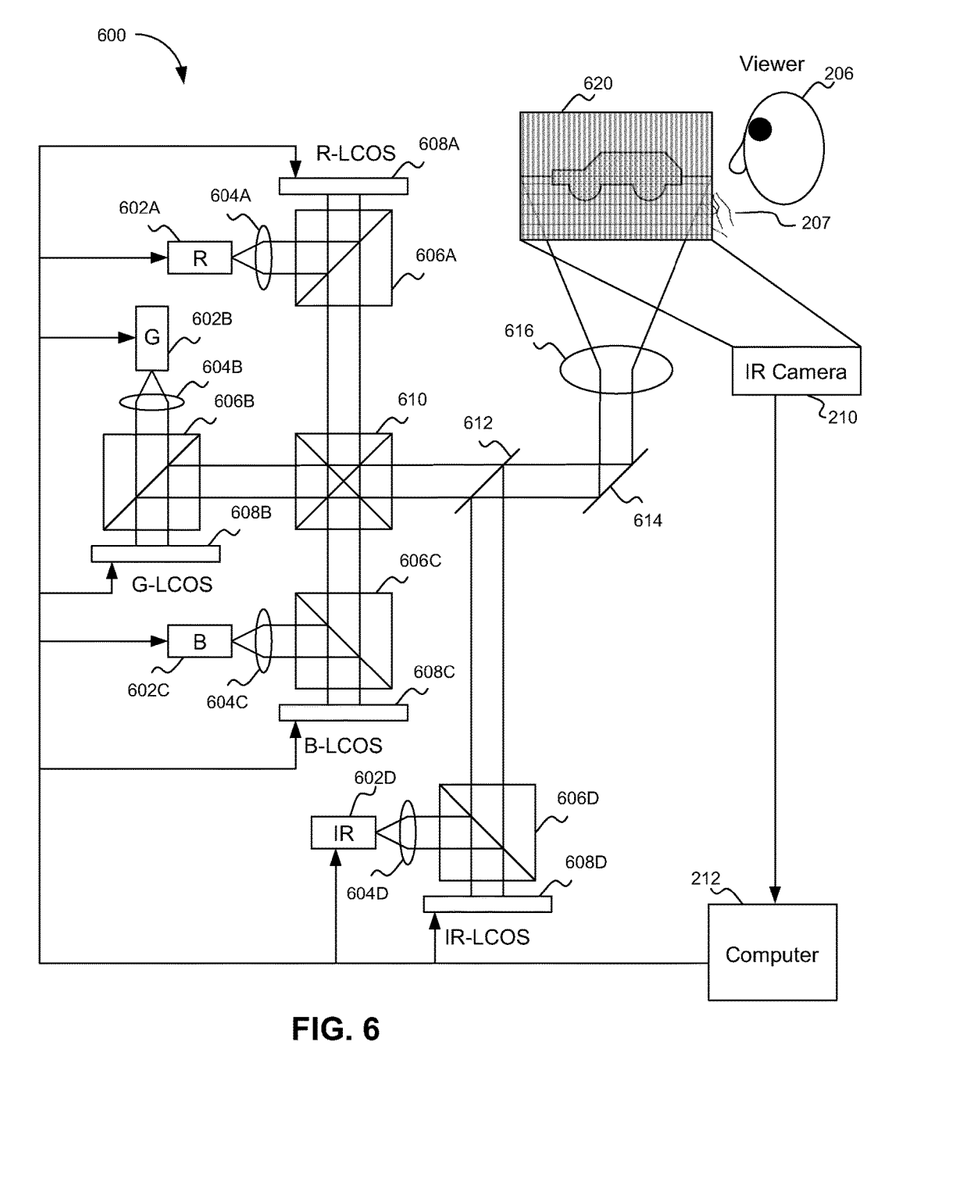
FIG. 6 shows yet another example of a LCOS projection display system in accordance with the teachings of the present invention.

FIG. 6 shows yet another example of an LCOS projection display system 600 in accordance with the teachings of the present invention. As shown in the depicted example, LCOS projection display system 600 includes four LCOS devices, which are shown as R-LCOS 608A, G-LCOS 608B, B-LCOS 608C, and IR-LCOS 608D, which in one example may be controlled by computer 212 in accordance with the teachings of the present invention. In the depicted example, LCOS projection display system 600 also includes a red (R) light source 602A, a green (G) light source 602B, a blue (B) light source 602C, and an IR light source 602D, which in one example may also be controlled by computer 212 in accordance with the teachings of the present invention. In the example depicted in FIG. 6, the R, G, B, and IR light sources may be lasers, LEDs, or other light sources.

As shown in the depicted example, a red light beam from R light source 602A is collimated by a lens 604A. The collimated beam is reflected by a PBS 606A to illuminate R-LCOS 608A. A red image is formed after the light beam reflected by R-LCOS 608A passing through PBS 606A. Similarly, a green light beam from G light source 602B is collimated by a lens 604B. The collimated beam is reflected by a PBS 606B to illuminate G-LCOS 608B. A green image is formed after the light beam reflected by G-LCOS 608B passing through PBS 606B. A blue light beam from B light source 602C is collimated by a lens 604C. The collimated beam is reflected by a PBS 606C to illuminate B-LCOS 608C. A blue image is formed after the light beam reflected by B-LCOS 608C passing through PBS 606C. The red, green, and blue images may be combined by a dichroic combiner cube (X-cube) 610. An IR light beam from IR light source 602D is collimated by a lens 604D. The collimated beam is reflected by a PBS 606D to illuminate IR-LCOS 608D. An IR image is formed after the light beam reflected by IR-LCOS 608D passing through PBS 606D. The IR image is combined with the combination of red, green, and blue images given by dichroic combiner cube 610 using a dichroic mirror 612.

As shown in the example, the combined red, green, blue, and IR images may be reflected by an optional mirror 614. A projection lens 616 projects the combined red, green, blue, and IR images on a screen 620. In this manner, a visible color image is generated on screen 620 overlapping with an invisible IR structured light pattern. A viewer 206 will see the visible color image, and an IR camera 210 will detect the invisible IR structured light pattern, and therefore detect hand 207 in front of screen 620 in accordance with the teachings of the present invention.

Referring back to the examples illustrated in FIGS. 5A-5B, it is appreciated that in other examples, the example LCOS projection display systems 500 and 501 may be modified such that it is no longer required to sequentially form the R, G, B and IR images on LCOS display panel 516. In these alternate examples, all of the R, G, B, and IR images are displayed at the same time (i.e., simultaneously in the same frame on the screen) on the LCOS display panel 516. In these alternate examples, a color filter array is disposed on the LCOS display panel 516 in accordance with the teachings of the present invention.

Figure 7:
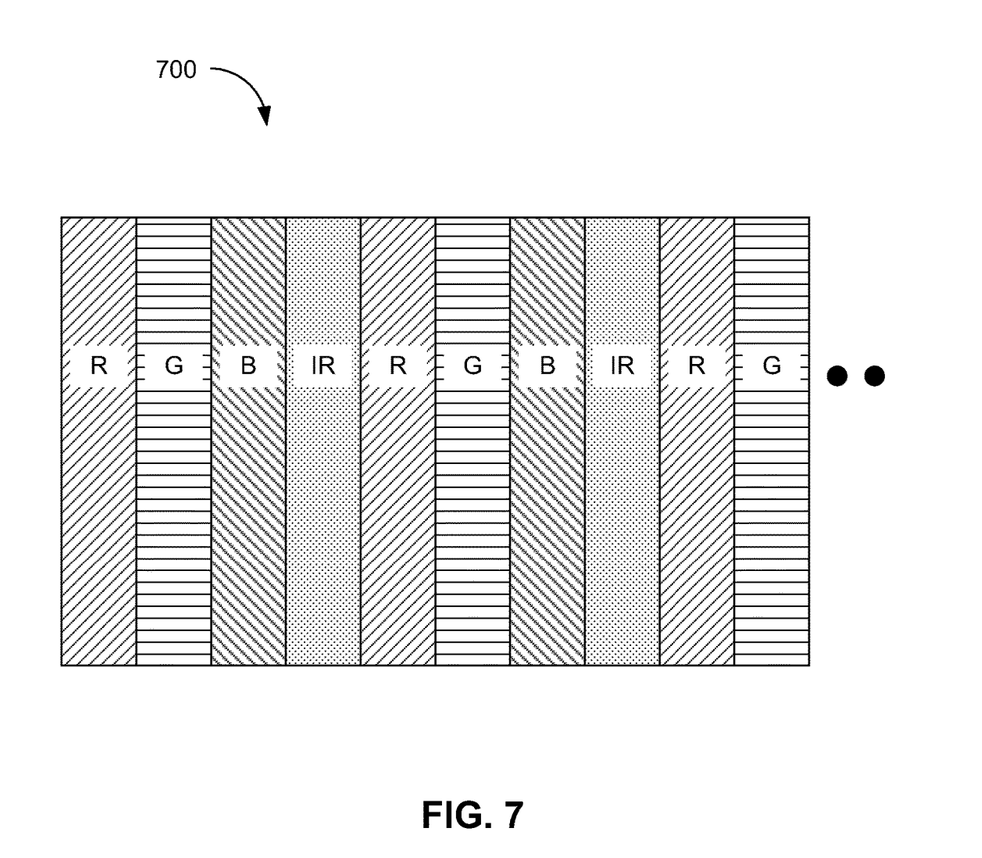
FIG. 7 shows an example color filter array which may for example be used on an example LCOS that simultaneously displays R, G, B, and IR images in accordance with the teachings of the present invention.

To illustrate, FIG. 7 shows an example color filter array 700 that includes R stripe filters, B stripe filters, G stripe filters, and IR stripe filters in accordance with the teachings of the present invention that may for example be used on an example LCOS that simultaneously displays R, G, B, and IR images in accordance with the teachings of the present invention. As shown in the depicted example, the R, G, B, and IR images are interleaved. In this manner, a visible color image is generated on a screen overlapping with an invisible IR structured light pattern. Accordingly, a human viewer will see the visible color image, and an IR camera will detect the invisible IR structured light pattern.

It is appreciated that in other examples, the example LCOS projection display systems 500, 501, and 600 discussed above in FIGS. 5A, 5B, and 6 may be replaced with a liquid crystal display (LCD) in accordance with the teachings of the present invention. In these various alternate examples, the LCDs may be either transmissive type LCDs or reflective type LCDs in accordance with the teachings of the present invention.

It is further appreciated that in other examples, the IR structured light pattern discussed above may be replaced with a uniform IR pattern. Thus, an object, e.g., hand 207 in front of the screen, may be under an IR uniform illumination in for example FIGS. 2-6 in accordance with the teachings of the present invention. In addition, in other examples, the IR camera 210 may be an IR time-of-flight camera that may be used for example in FIGS. 2-6 to create a 3D image of the object by measuring the time of flight of every point of the object in accordance with the teachings of the present invention. Alternatively, in other examples, the IR camera 210 as shown for example in FIGS. 2-6 may be one of a plurality of IR cameras used to capture stereo or multiple images of the object in accordance with the teachings of the present invention. The object captured in the images can be triangulated to create a 3D image in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A projection display system, comprising:
   a visible light source coupled to project a visible image onto a screen, wherein the visible light source includes a first light source, a second light source, and a third light source, wherein the first light source, the second light source, and the third light source are optically coupled in series via a plurality of dichroic mirrors;
   an infrared (IR) light source coupled to project a non-visible IR image onto the screen, wherein the non-visible IR image on the screen is independent of the visible image on the screen, and wherein the visible image and the non-visible IR image are overlapped and displayed simultaneously on the screen;
   a liquid crystal on silicon (LCOS) display panel, wherein the visible light source and the IR light source are coupled to illuminate the LCOS display panel;
   a projection lens, wherein the visible light source and the IR light source are coupled to project the visible image and the non-visible IR image onto the screen through the projection lens; and a polarizing beam splitter (PBS) disposed to receive light from the visible light source and the IR light source and coupled to reflect the received light to the LCOS display panel, wherein the LCOS display panel is coupled to reflect the received light through the PBS to the projection lens wherein the PBS is optically coupled between the plurality of dichroic mirrors and the LCOS display panel, and wherein the non-visible IR image projected onto the screen with IR light comprises a non-visible IR structured light pattern to detect an object in front of the screen, and wherein the LCOS display panel includes a color filter array with red, green, blue, and IR color filters to project the visible image and the non-visible IR image onto the screen.

2. The projection display system of claim 1 further comprising:
an IR camera coupled to detect the non-visible IR image projected onto the screen by the IR light source; and
a computer coupled to the IR camera to analyze the non-visible IR image projected onto the screen by the IR light source.

3. The projection display system of claim 2, wherein the computer is coupled to recognize a gesture of an object in front of the screen in response to an analysis of the non-visible IR image projected onto the screen by the IR light source for gesture recognition.

4. The projection display system of claim 1 wherein the first light source is a red color light source, wherein the second light source is a green color light source, wherein the third light source is a blue color light source, and wherein the visible image is a color visible image.

5. A projection display system, comprising:
a visible light source coupled to project a visible image onto a screen, wherein the visible light source includes a first light source, a second light source, and a third light source, wherein the first light source, the second light source, and the third light source are optically coupled in series via a plurality of dichroic mirrors;
an infrared (IR) light source coupled to project a non-visible IR image onto the screen, wherein the non-visible IR image on the screen is independent of the visible image on the screen, and wherein the visible image and the non-visible IR image are overlapped and displayed simultaneously on the screen;
a digital micro-mirror device (DMD), wherein the visible light source and the IR light source are coupled to illuminate the DMD;
a projection lens, wherein the visible light source and the IR light source are coupled to project the visible image and the non-visible IR image onto the screen through the projection lens; and
an expanding lens disposed to receive light from the visible light source and the IR light source, wherein the expanding lens magnifies the received light and is coupled to direct the magnified received light to the DMD, wherein the DMD is coupled to reflect the magnified received light to the projection lens, wherein the expanding lens is optically coupled between the plurality of dichroic mirrors and the DMD, and
wherein the non-visible IR image projected onto the screen with IR light comprises a non-visible IR structured light pattern to detect an object in front of the screen.

6. A projection display system, comprising:
a visible light source coupled to project a visible image onto a screen, wherein the visible light source comprises a red light source, a green light source, and a blue light source;
an infrared (IR) light source coupled to project a non-visible IR image onto the screen, wherein the non-visible IR image on the screen is independent of the visible image on the screen, and wherein the visible image and the non-visible IR image are overlapped and displayed simultaneously on the screen;
one or more liquid crystal on silicon (LCOS) display panels, wherein the visible light source and the IR light source are coupled to illuminate the one or more LCOS display panels; and
a projection lens, wherein the visible light source and the IR light source are coupled to project the visible image and the non-visible IR image onto the screen through the projection lens; and
a dichroic combiner cube optically coupled between the red light source, the green light source, and the blue light source;
a plurality of polarizing beam splitters (PBS) included a first PBS, a second PBS, and a third PBS, wherein the first PBS is optically coupled between the red light source and the dichroic combiner cube, wherein the second PBS is optically coupled between the green light source and the dichroic combiner cube, and wherein the third PBS is optically coupled between the blue light source and the dichroic combiner cube.

7. A projection display system, comprising:
a visible light source coupled to project a visible image onto a screen, wherein the visible light source comprises a red light source, a green light source, and a blue light source;
an infrared (IR) light source coupled to project a non-visible IR image onto the screen, wherein the non-visible IR image on the screen is independent of the visible image on the screen, and wherein the visible image and the non-visible IR image are overlapped and displayed simultaneously on the screen;
a plurality of liquid crystal on silicon (LCOS) display panels including a first LCOS display panel, a second LCOS display panel, a third LCOS display panel, and a fourth LCOS display panel, wherein the first LCOS display panel is optically coupled to the red light source, wherein the second LCOS display panel is optically coupled to the green light source, wherein the third LCOS display panel is optically coupled to the blue light source, and wherein the fourth LCOS display panel is optically coupled to the IR light source;
a dichroic combiner cube optically coupled between the first LCOS display panel, the second LCOS display panel, and the third LCOS display panel; and
a projection lens, wherein the visible light source and the IR light source are coupled to project the visible image and the non-visible IR image onto the screen through the projection lens.

8. A method, comprising:
projecting a visible image onto a screen of a liquid crystal on silicon (LCOS) display panel with visible light from a visible light source, wherein the visible light source includes a first light source, a second light source, and a third light source, wherein the first light source, the second light source, and the third light source are optically coupled in series via a plurality of dichroic mirrors; and simultaneously projecting a non-visible infrared (IR) image onto the screen with IR light using the LCOS display panel, wherein the non-visible IR image on the screen is independent of and overlaps the visible image on the screen, wherein a polarizing beam splitter (PBS) is optically coupled between the plurality of dichroic mirrors and the LCOS display panel to receive light from the visible light source and the IR light source and coupled to reflect the received light to the LCOS display panel, wherein simultaneously projecting the non-visible IR image onto the screen with IR light using the LCOS display panel comprises projecting a non-visible IR structured light pattern onto the screen overlapping with the visible image to detect an object in front of the screen, wherein said projecting the visible image onto the screen with visible light comprises projecting a visible color image onto the screen with red, green, and blue light, and wherein said projecting the color image onto the screen and said simultaneously projecting the non-visible infrared IR image onto the screen with IR light comprises sequentially displaying red, green, blue, and IR images on the screen, wherein the LCOS display panel includes a color filter array with red, green, blue, and IR color filters to project the visible image and the non-visible IR image onto the screen.

9. The method of claim 8 further comprising detecting the non-visible IR image projected onto the screen with an IR camera.

10. The method of claim 9 further comprising analyzing the non-visible IR image projected onto the screen by the IR light source to recognize a gesture of an object in front of the screen.

11. The method of claim 8 further comprising dynamically changing the non-visible IR image onto the screen independent of the visible image on the screen.

12. The projection display system of claim 7, further comprising a plurality of polarizing beam splitters, wherein each of the red light source, the green light source, the blue light source, and the IR light source are optically coupled to an individual polarizing beam splitter in the plurality of polarizing beam splitters.

13. The projection display system of claim 12, wherein the plurality of polarizing beam splitters are optically coupled between each of the red light source, the green light source, the blue light source, and the IR light source and a corresponding one of the plurality of LCOS display panels.

14. The projection display system of claim 6, wherein the one or more LCOS display panels includes a first LCOS display panel, a second LCOS display panel, and a third LCOS display panel, wherein the first PBS is optically coupled between the first LCOS display panel and the dichroic combiner cube, wherein the second PBS is optically coupled between the second LCOS display panel and the dichroic combiner cube, and wherein the third PBS is optically coupled between the third LCOS display panel and the dichroic combiner cube.

15. The projection display system of claim 6, further comprising:
a dichroic mirror optically coupled between the dichroic combiner cube and the projection lens, wherein the plurality of PBS includes a fourth PBS, wherein the one or more LCOS display panels includes a fourth LCOS display panel, wherein the fourth PBS is optically coupled between the IR light source and the fourth LCOS display panel, and wherein the dichroic mirror is optically coupled between the fourth PBS and the dichroic combiner cube.

* * * * *